(12) United States Patent
Keeney et al.

(10) Patent No.: US 9,038,994 B2
(45) Date of Patent: May 26, 2015

(54) AIR SPRING PROTECTOR

(75) Inventors: Christopher S. Keeney, Troy, MI (US); Edward J. Eshelman, Rochester Hills, MI (US); Christine L. Lutz, Sheboygan, WI (US)

(73) Assignee: ARVINMERITOR TECHNOLOGY, LLC, Troy, MI (US)

( * ) Notice: Subject to any disclaimer, the term of this patent is extended or adjusted under 35 U.S.C. 154(b) by 1008 days.

(21) Appl. No.: 12/172,449

(22) Filed: Jul. 14, 2008

(65) Prior Publication Data

US 2008/0265475 A1 Oct. 30, 2008

Related U.S. Application Data

(63) Continuation-in-part of application No. 11/373,471, filed on Mar. 10, 2006, now abandoned.

(60) Provisional application No. 60/663,951, filed on Mar. 21, 2005.

(51) Int. Cl.
*F16F 9/38* (2006.01)
*F16F 9/04* (2006.01)

(52) U.S. Cl.
CPC .... *F16F 9/04* (2013.01); *F16F 9/38* (2013.01)

(58) Field of Classification Search
USPC .......... 267/64.19, 64.21, 64.23, 64.24, 64.27; 188/322.12
See application file for complete search history.

(56) References Cited

U.S. PATENT DOCUMENTS

| | | | |
|---|---|---|---|
| 2,133,279 A * | 10/1938 | Brown | 267/256 |
| 3,438,309 A | 4/1969 | Boileau | |
| 4,294,324 A | 10/1981 | Kimball et al. | |
| 4,712,776 A * | 12/1987 | Geno et al. | 267/64.21 |
| 4,722,516 A | 2/1988 | Gregg | |
| 4,741,517 A | 5/1988 | Warmouth, II et al. | |
| 5,129,634 A * | 7/1992 | Harris | 267/64.24 |
| 5,209,316 A | 5/1993 | Bauer | |
| 6,139,027 A | 10/2000 | Biekx | |
| 6,637,733 B1 | 10/2003 | Weitzenhof et al. | |
| 6,845,973 B2 | 1/2005 | Ferrer | |
| 2004/0012131 A1 | 1/2004 | Bank et al. | |
| 2004/0026836 A1 | 2/2004 | Brookes | |
| 2004/0119212 A1 | 6/2004 | Gleu | |
| 2005/0184480 A1 | 8/2005 | Arlt et al. | |

FOREIGN PATENT DOCUMENTS

KR   2003-0040959   5/2003

* cited by examiner

*Primary Examiner* — Robert A Siconolfi
*Assistant Examiner* — Vu Q Nguyen
(74) *Attorney, Agent, or Firm* — Brooks Kushman P.C.

(57) ABSTRACT

An air spring for a vehicle suspension includes a resilient spring body that is partially surrounded by a protective cover. The protective cover protects the resilient spring body from rupturing when used in harsh vehicle conditions. The protective cover is comprised of a rigid or flexible armor material that is resistive to munitions, such as projectiles and razor wire, for example.

22 Claims, 6 Drawing Sheets

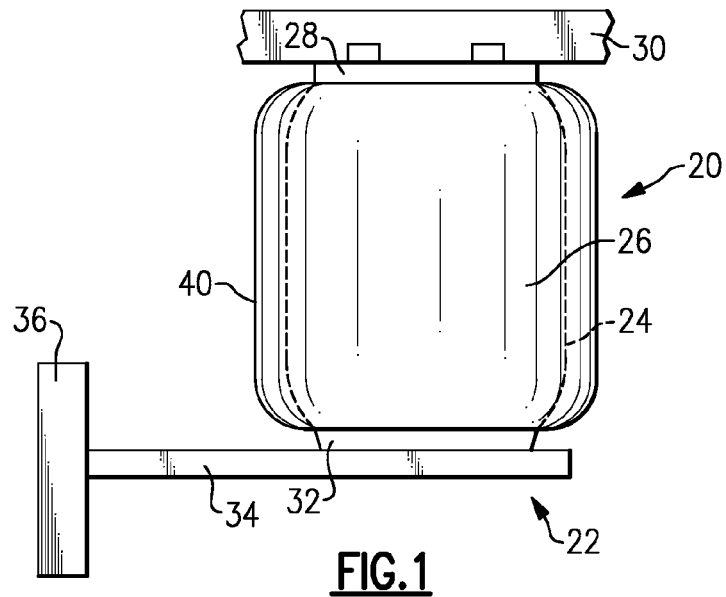
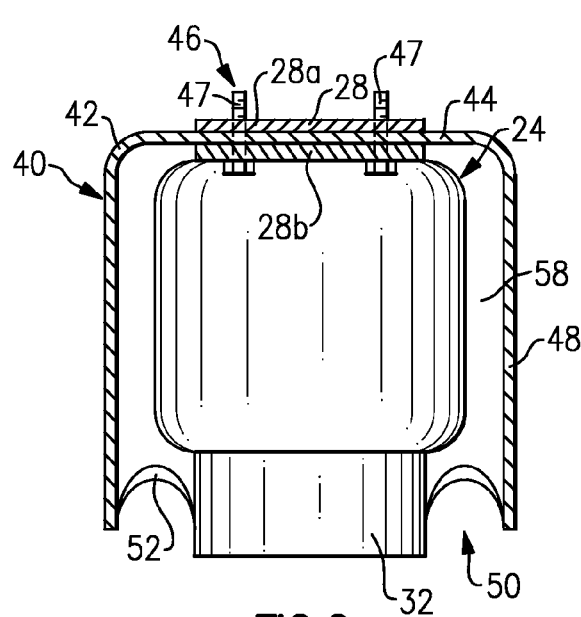
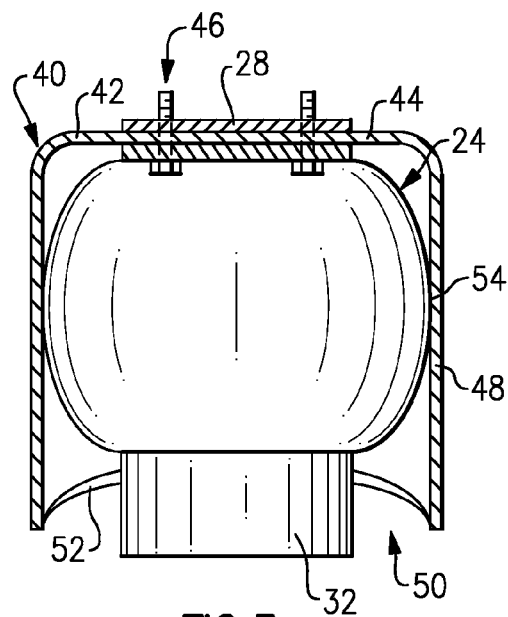

AIR SPRING PROTECTOR

RELATED APPLICATIONS

This application is a continuation-in-part application of U.S. patent application Ser. No. 11/373,471 filed on Mar. 10, 2006 now abandoned, which claims priority to U.S. provisional application Ser. No. 60/663,951 filed on Mar. 21, 2005.

TECHNICAL FIELD

This invention generally relates to a protective cover for an air spring in a vehicle suspension.

BACKGROUND OF THE INVENTION

Vehicle suspensions utilize components such as springs and shock absorbers to improve vehicle ride characteristics by accommodating variations in road surfaces. There are many different types of vehicle suspensions including mechanical suspensions and air suspensions. Mechanical suspensions utilize components such as leaf springs, for example, while air suspensions utilize air springs.

Air suspensions provide improved performance characteristics compared to traditional mechanical suspensions. Air suspensions offer improved mobility and ride characteristics, as well as providing many beneficial functions that cannot be accommodated by mechanical suspensions. Due to these improved performance characteristics, air suspensions have been widely adopted in commercial vehicle markets.

However, air suspensions have not traditionally been utilized for harsh condition or severe duty applications such as military applications, for example. One concern with air suspensions in these types of applications is air spring integrity. The air springs are typically made from a resilient material, such as rubber for example, which could be susceptible to rupturing. Munitions or other military obstacles, such as razor wire for example, could snag or pierce the air spring causing the air spring to deflate, which consequently adversely affects suspension performance.

For the above reasons, it would be desirable to provide an air suspension with air springs that are protected from harsh external environments.

SUMMARY OF THE INVENTION

An air spring for a vehicle suspension utilizes a protective cover to prevent the air spring from rupturing when used in harsh vehicle operating conditions.

In one example, the air spring includes a resilient spring body that is mounted between a vehicle structure and a suspension component, such as a control arm for an independent suspension. The protective cover is comprised of an armor material that is resistive to penetration by projectiles, and which is resistive to being slashed or cut by sharp objects.

In one example, the resilient spring body defines a central axis extending along a length of the resilient spring body. The resilient spring body has an outer circumferential surface surrounding the central axis and an inner circumferential surface that defines an interior cavity. The protective cover partially surrounds one portion of the outer circumferential surface to leave a remaining portion of the outer circumferential surface that is externally exposed.

In one example, the protective cover has a variable cross-section taken along a direction that is parallel to the central axis.

In one example, the protective cover is comprised of a rigid material that surrounds a portion of the resilient spring body.

In one example, a flexible connection extends between the air spring and the rigid material to allow rebound and extension movement of the resilient spring body.

In another example, the protective cover is comprised of a flexible material that surrounds the resilient spring body. The flexible material allows the protective cover to expand and contract in response to movement of the resilient spring body.

In addition to providing protection from rupturing under harsh external environmental conditions, the protective cover can provide jounce and/or rebound travel limiting functionality. This can be achieved by designing the protective cover to constrain outward movement and/or extension length of the resilient spring body. This goal can be achieved with either a rigid or flexible protective cover.

These and other features of the present invention can be best understood from the following specification and drawings, the following of which is a brief description.

BRIEF DESCRIPTION OF THE DRAWINGS

FIG. 1 is a schematic view of an air spring and protective cover mounted in a vehicle suspension.

FIG. 2 is one example of an air spring and protective cover incorporating the subject invention in a first position.

FIG. 3 shows the air spring of FIG. 2 in a second position different from the first position.

DETAILED DESCRIPTION OF THE PREFERRED EMBODIMENT

Figure 4:
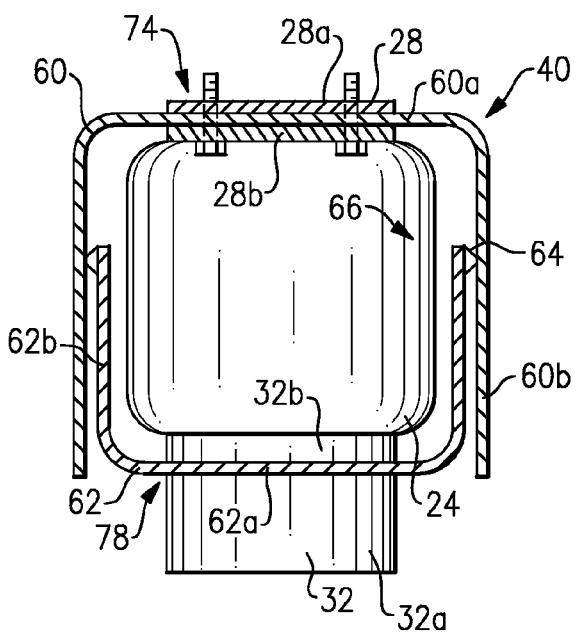
FIG. 4 is another example of an air spring and protective cover incorporating the subject invention in a first position.

An air spring 20 for a vehicle suspension 22 is shown in FIG. 1. The air spring 20 includes a resilient spring body 24 that defines an inner cavity 26. The inner cavity 26 is filled with air as known. The resilient spring body 24 is preferably made from a rubber material, however, other resilient materials could also be used to form the resilient spring body 24.

A first support 28 is used to mount the air spring 20 to a vehicle structure 30, such as a vehicle frame member, for example. A second support 32 is used to mount the air spring 20 to a suspension component 34. In the example shown in FIG. 1, the suspension component 34 preferably comprises a control arm that is supported by a vehicle wheel component shown schematically at 36. The control arm is preferably utilized in an independent suspension, however, it should be understood that an air spring 20 designed according to the subject invention could be used in any type of air suspension. Further, the air spring 20 could also be supported by suspension components other than a control arm.

The air spring 20 includes a protective cover 40 that substantially surrounds the resilient spring body 24. The protective cover 40 can be made from a rigid or flexible material. In the examples shown in FIGS. 2-6, the protective cover 40 is made from a rigid armor material such as steel, KEVLAR®, or a composite material for example. Other armor materials could also be used to form the protective cover 40, however, the material should be resistive to rupturing due to munitions or other military obstacles, such as razor wire for example.

In FIG. 2, the protective cover 40 comprises a rigid cover 42 that is cup-shaped. The rigid cover 42 includes a base portion 44 that is rigidly connected to the first support 28 at a connection interface 46, and a wall portion 48 that extends from the base portion 44 to surround the resilient spring body 24. The base portion 44 covers one end of the resilient spring body 24 and the wall portion 48 surrounds an outer circumference of the resilient spring body 24. The rigid cover 42 includes an open end 50 adjacent the second support 32.

In the example shown, the connection interface 46 is comprised of a plurality of fasteners 47, such as bolts for example. The first support 28 includes a first portion 28a that is positioned on one side of the base portion 44 and a second portion 28b that is positioned on an opposite side of the base portion 44, such that the base portion is directly sandwiched between the first 28a and second 28b portions. The first 28a and second 28b portions are preferably formed as rigid plates. This provides a rigid, fixed, and secure connection interface 46 to the vehicle structure 30 (FIG. 1).

A flexible connection 52 extends between the second support 32 and the wall portion 48 of the rigid cover 42. The flexible connection 52 accommodates suspension articulation. The flexible connection 52 can be made from a flexible steel mesh, however, other materials could also be used. The flexible connection 52 encloses the open end 50 of the rigid cover 42 to further protect an underside of the resilient spring body 24. The flexible connection 52 could also provide rebound travel limiting functionality by being designed to become taut at an extreme rebound position.

When not subjected to a suspension load, or when operating under normal loading operations, the rigid cover 42 is separated from the outer circumference of the resilient spring body 24 by a gap 58. The flexible connection 52 could provide jounce and/or rebound travel limiting functionality by designing the rigid cover 42 to constrain the resilient spring body 24, as the resilient spring body 24 bulges out in a jounce mode as shown at 54 in FIG. 3.

The configuration shown in FIGS. 2-3 is just one example of a flexible connection 52. It should be understood that the flexible connection 52 could have other configurations including being positioned at other locations within the rigid cover 42. Also, additional flexible connections 52 could be incorporated into the air spring 20, if necessary depending upon vehicle applications.

Figure 5:
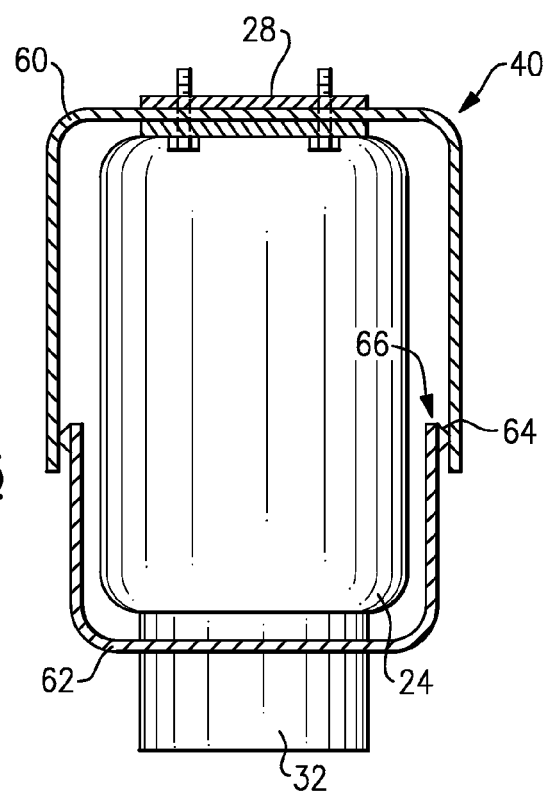
FIG. 5 shows the air spring of FIG. 4 in a second position different from the first position.

Another example of a protective cover 40 is shown in FIGS. 4-5. In this example, the protective cover 40 includes a first portion 60 and a second portion 62 that at least partially overlap each other. This overlapping relationship allows relative sliding movement between the first 60 and second 62 portions between a retracted position (FIG. 4) and an extended position (FIG. 5).

The first portion 60 is rigidly connected to the first support 28 and the second portion 62 is rigidly connected to the second support 32. The first portion 60 is cup-shaped with a base portion 60a and a wall portion 60b that extends from the base portion 60a to surround the resilient spring body 24. The base portion 60a is rigidly connected to the first support 28 at a connection interface 74. The first support 28 includes first 28a and second 28b portions as discussed above. The base portion 60a is directly sandwiched between the first 28a and second 28b portions to provide a rigid, fixed, and secure connection interface 74 to the vehicle structure 30 (FIG. 1).

The second portion 62 is also cup-shaped with a base portion 62a and a wall portion 62b that extends from the base portion 62a to surround the resilient spring body 24. The base portion 62a is rigidly connected to the second support 32 at a connection interface 78. The second support 32 includes a first portion 32a positioned on one side of the base portion 62a, and a second portion 32b positioned on an opposite side of the base portion 62a. The base portion 62a is directly sandwiched between the first 32a and second 32b portions to provide a rigid, fixed, and secure connection interface 78 to the suspension component 34 (FIG. 1). Any type of connecting mechanism can be used to for the connection interfaces 74, 78, such as a bolted joint for example (only shown for connection interface 74).

In this configuration, upper and lower ends, as well as the side wall of the resilient spring body 24, are enclosed by the protective cover 40. Rebound and extension movement of the resilient spring body 24 is accommodated by a sliding interface 66 between the first 60 and second 62 portions. An optional seal and/or friction bearing 64 is provided between the first 60 and second 62 portions at the sliding interface 66. It should be understood that while the example shown in FIGS. 4-5 has the second portion 62 received within the first portion 60, the reverse configuration could also be used.

Figure 6:
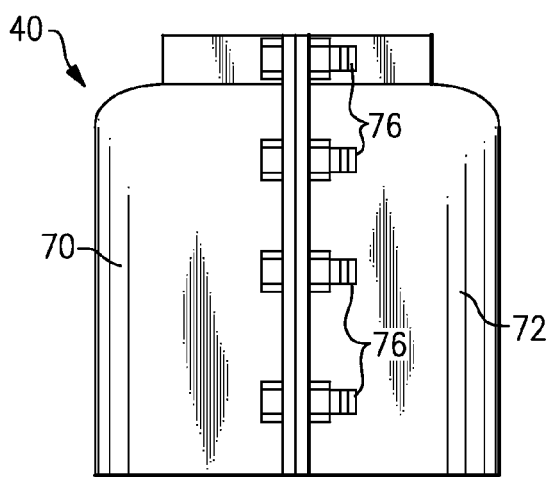
FIG. 6 is another example of a protective cover incorporating the subject invention.

Another embodiment of the protective cover 40 is shown in FIG. 6. In this example, the protective cover 40 includes a first half 70 and a second half 72 that are fastened together to surround the resilient spring body 24. The first 70 and second 72 halves are made from a flexible impenetrable armor material such as ballistic nylon, KEVLAR®, or a stainless steel mesh material for example. Optionally, the protective cover 40 could be made from a rigid armor material as described above, with an open end such as that shown in FIGS. 2-3 with a flexible connection 52.

In the example shown, the first 70 and second 72 halves are fastened together with a plurality of bolts 76, however other types of fasteners or attachment interfaces could also be used. One of the benefits of the example shown in FIG. 7 is that the first 70 and second 72 halves of the protective cover 40 are easily separated to facilitate maintenance or to reduce weight when the vehicle is not being subjected to harsh external environments.

Figure 7:
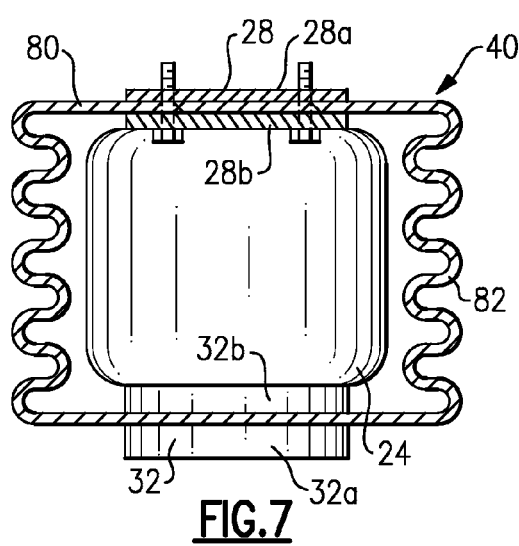
FIG. 7 is another example of an air spring and protective cover incorporating the subject invention in a first position.
Figure 8:
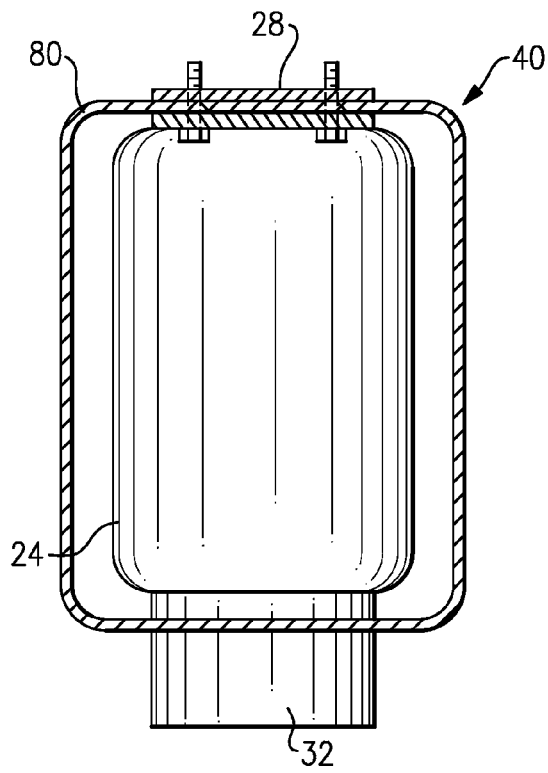
FIG. 8 shows the air spring of FIG. 7 in a second position different from the first position.

In FIGS. 7-8, the resilient spring body 24 is enclosed within a flak jacket 80 that has an accordion body portion 82. One portion of the flak jacket 80 is connected to the first support 28 and another portion of the flak jacket 80 is connected to the second support 32. The first 28 and second 32 supports have first 28a, 32a and second portions 28b, 32b that sandwich the flak jacket 80 in a manner similar to that described above.

The accordion body configuration provides compact packaging and extension characteristics. The accordion body portion 82 is movable between a collapsed position (FIG. 7) and an extended position (FIG. 8) where the accordion body portion 82 is taut. The flak jacket 80 can be designed to provide jounce and/or rebound travel limiting functionality by achieving a taut position at a corresponding extreme position of travel.

Figure 9:
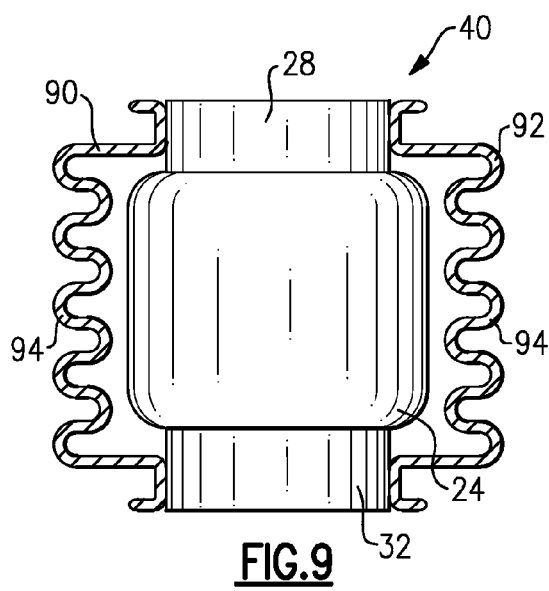
FIG. 9 is another example of an air spring and protective cover incorporating the subject invention.
Figure 10:
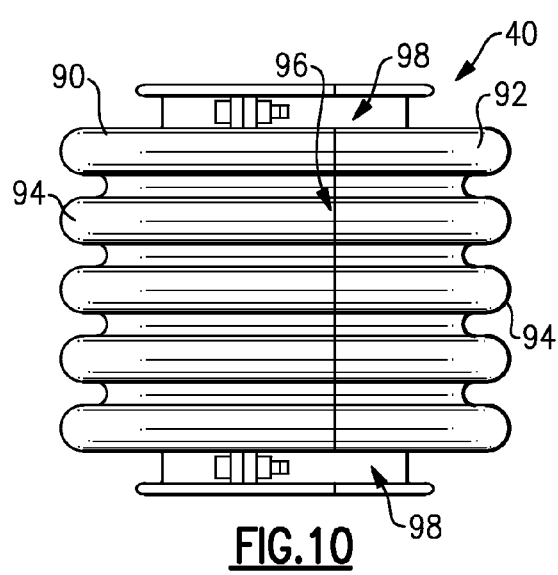
FIG. 10 shows the protective cover of FIG. 9 completely surrounding the air spring and being secured with clamps.

Another example of a protective cover 40 is shown in FIGS. 9-10. In this example, the resilient spring body 24 is enclosed within a flak jacket having first 90 and second 92 flak jacket portions that are clamped together. The flak jacket includes an accordion body portion 94 similar to that described above.

The first 90 and second 92 flak jacket portions overlap each other at a seam portion 96 to provide a tight seal. At least one clamp 98 is used to hold the first 90 and second 92 flak jacket portions together. Any type of clamp can be used including a hose clamp, for example.

In the example shown in FIG. 10, the first 90 and second 92 flak jacket portions are formed as a one-piece flak jacket with one seam portion 96. A first clamp 98 is used to secure an upper portion of the flak jacket to the first support 28 and a second clamp 98 is used to secure a lower portion of the flak jacket to the second support 32. While a one-piece flack jacket is shown as including first 90 and second 92 flak jacket portions with a single seam portion 96, it should be understood that the first 90 and second 92 flak jacket portions could also be separate pieces having two seam portions 96 that are clamped together.

One of the benefits of the example shown in FIGS. 9-10 is that the first 90 and second 92 flak jacket portions of the protective cover 40 are easily separated to facilitate maintenance or to reduce weight when the vehicle is not being subjected to harsh external environments.

In the examples shown in FIGS. 7-10, the protective cover 40 is made from a flexible impenetrable armor material such as ballistic nylon, KEVLAR®, or a stainless steel mesh material for example; however, other flexible impenetrable materials could also be used to form the protective cover 40. The accordion shape shown for the examples of FIGS. 7-10 is just one example shape, and it should be understood that other expandable shapes could also be used.

Further, it should be understood that the protective covers 40 shown in FIGS. 2-10 are just a few examples of different cover configurations. The disclosed protective cover 40 could also be formed to have other shapes or sizes.

Finally, the protective cover 40 is made from armor or other impenetrable materials, which can be either rigid or flexible, but which are resistive to penetration by a ballistic projectile such as a bullet or missile, for example. This allows a more beneficial air suspension to be utilized in harsh environment vehicle applications.

The examples shown in FIGS. 1-10 show protective covers that completely surround the outer circumferential surface of the respective air spring. One disadvantage with this type of configuration is the increased weight that occurs due to the incorporation of the protective cover over the air spring. As known, increasing the weight of a component adversely affects fuel economy.

FIGS. 11-21 show examples of protective covers that only surround a portion of the outer circumferential surface of the air spring. In these examples, a portion of the outer circumferential surface of the air springs remains exposed to the external environment. Forming the protective cover to only cover a limited portion of the air spring significantly reduces weight. The exposed portion is positioned at a location that faces inwardly toward a vehicle center. As such, the vehicle itself provides the protection for this exposed portion as the exposed portion is less likely to be subjected to external penetrating members. The portion of the air spring that is covered by the protective cover faces outwardly away from the vehicle center where the air spring is more likely to be exposed to munitions or other external penetrating members.

To provide this partially exposed portion of the air spring, the protective covers are formed in a non-symmetrical configuration. FIGS. 11-21 show various different non-symmetrical configurations. In each configuration, the protective cover has a variable cross-section in a direction taken along a central axis of the air spring.

Figure 11:
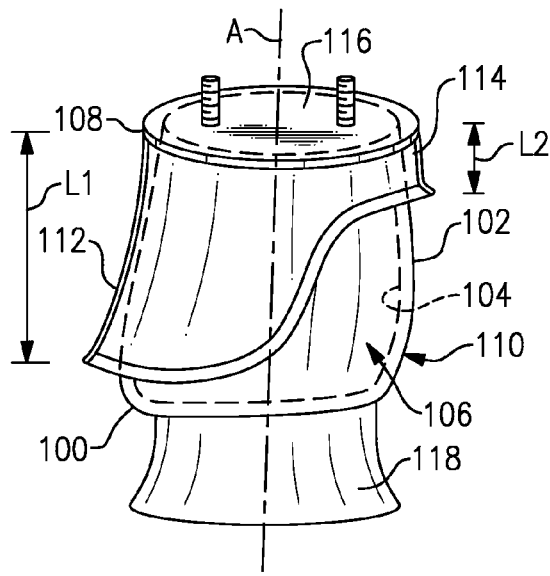
FIG. 11 shows another example of a protective cover and air spring.

FIG. 11 shows one example of an air spring 100 defining a central axis A extending along a length of the air spring 100. The air spring 100 has a resilient spring body that is made from a rubber material or other resilient material, for example. The air spring 100 has an outer circumferential surface 102 that surrounds the central axis A and an inner circumferential surface 104 that defines an internal cavity 106 that is filled with air as known. A protective cover 108 having a non-symmetrical configuration about the central axis A covers a portion of the outer circumferential surface 102 leaving an exposed portion 110 of the outer circumferential surface 102.

As shown in FIG. 11, the protective cover 108 has a first portion 112 that is defined by a first length L1 extending in an axial direction parallel to the central axis A and a second portion 114 that is defined by a second length L2 extending in an axial direction parallel to the central axis A. The second length L2 is significantly shorter than the first length L1 to provide the open area of the protective cover 108 that defines the exposed portion 110.

The protective cover 108 is generally helmet-shaped and includes a generally flat upper surface 116 that extends over a top of the air spring 100. The upper surface 116 includes mounting structure for securement to the vehicle. Mounting structure 118 is also associated with a bottom of the air spring 100 to be coupled to a wheel structure. As shown in FIG. 11, no portion of the protective cover 108 is fixed to the mounting structure 118.

Figure 12:
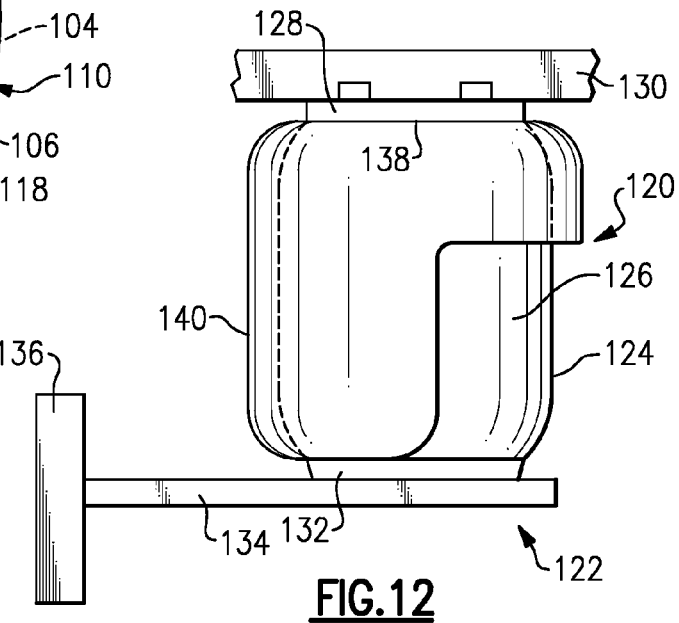
FIG. 12 is another example of an air spring and protective cover mounted in a vehicle suspension.

FIG. 12 shows another example of an air spring 120 as installed within a vehicle suspension 122. The air spring 120 includes a resilient spring body 124 having an inner cavity as described above. A first support 128 is used to mount the air spring 120 to a vehicle structure 130, such as a vehicle frame member, for example. A second support 132 is used to mount the air spring 120 to a suspension component 134 such as an independent suspension control arm for example, which is coupled to a vehicle wheel 136. The air spring 120 could also be used in other types of air suspensions and could also be supported by suspension components other than a control arm.

The air spring 120 includes a protective cover 140 that only partially surrounds the resilient spring body 124. The protective cover 140 can be made from a rigid or flexible material. In the examples shown in FIGS. 11-17, the protective cover 140 is made from a rigid armor material such as steel, KEVLAR®, or a composite material for example. Other armor materials could also be used to form the protective cover 140, however, the material should be resistive to rupturing due to munitions or other military obstacles, such as razor wire, for example.

As discussed above, the protective cover 140 is non-symmetrically configured (similar to that of FIG. 11) to leave an externally exposed portion 126 of the resilient spring body 124. The protective cover 140 also includes an upper portion 138 that covers a top of the resilient spring body 124 and which is secured to the first support 128.

Figure 13:
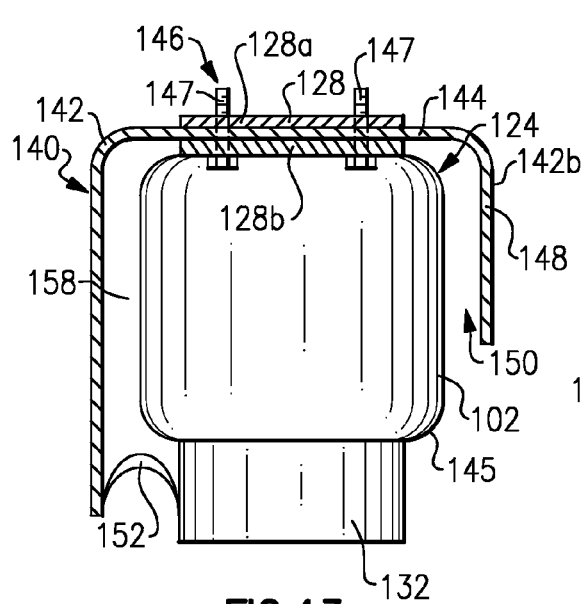
FIG. 13 is another example of an air spring and protective cover in a first position.

In FIG. 13, the protective cover 140 comprises a rigid cover 142 that includes a base portion 144 that is rigidly connected to the first support 128 at a connection interface 146, and a wall portion 148 that extends from the base portion 144 to surround a portion of the resilient spring body 124. The base portion 144 covers a top end of the resilient spring body 124 and the wall portion 148 surrounds a portion of the outer circumferential surface 102 of the air spring. The rigid cover 42 is open at an end 150 opposite of the base portion 144.

The rigid cover 142 has a first portion 142a that covers one entire side of the air spring and a second portion 142b that covers only a portion of an opposite side of the air spring, leaving an exposed portion 145. As shown, the first portion 142a has a significantly greater length than the second portion 142b.

In the example shown, the connection interface 146 is comprised of a plurality of fasteners 147, such as bolts for example. The first support 128 includes a first portion 128a that is positioned on one side of the base portion 144 and a second portion 128b that is positioned on an opposite side of the base portion 44, such that the base portion 144 is directly sandwiched between the first 128a and second 128b portions. The first 128a and second 128b portions are formed as rigid plates, for example. This provides a rigid, fixed, and secure connection interface 146 to the vehicle structure 130 (FIG. 12).

A flexible connection 152 extends between the second support 132 and the wall portion 148 of the rigid cover 142 at the first portion 142a. The flexible connection 152 accommodates suspension articulation. The flexible connection 152 can be made from a flexible steel mesh, however, other materials could also be used. The flexible connection 152 encloses the open end 150 of the rigid cover 142 at an outwardly facing side of the air spring to further protect an underside of the resilient spring body 124. The flexible connection 152 could also provide rebound travel limiting functionality by being designed to become taut at an extreme rebound position.

When not subjected to a suspension load, or when operating under normal loading operations, the rigid cover 142 is separated from the outer circumferential surface 102 of the resilient spring body 24 by a gap 158. The flexible connection 152 could provide jounce and/or rebound travel limiting functionality by designing the rigid cover 142 to constrain the resilient spring body 124 as the resilient spring body 224 bulges out in a jounce mode as shown at 154 in FIG. 14.

Figure 14:
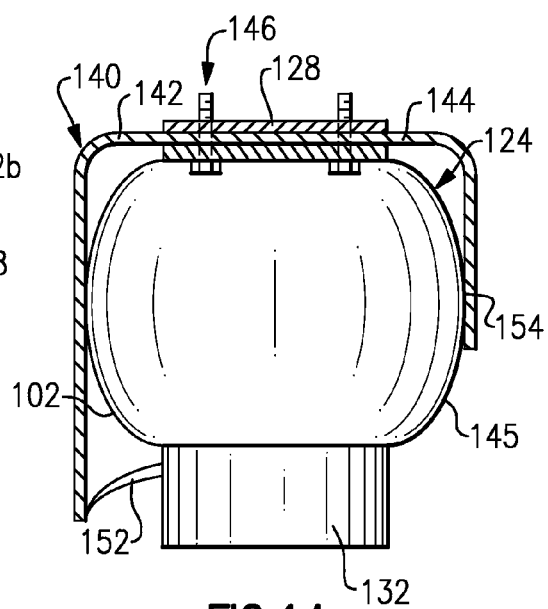
FIG. 14 shows the air spring of FIG. 13 in a second position different from the first position.

The configuration shown in FIGS. 13-14 is just one example of a flexible connection 152. It should be understood that the flexible connection 152 could have other configurations including being positioned at other locations within the rigid cover 142. Also, additional flexible connections 152 could be incorporated into the air spring 120, if necessary depending upon vehicle applications.

Figure 15:
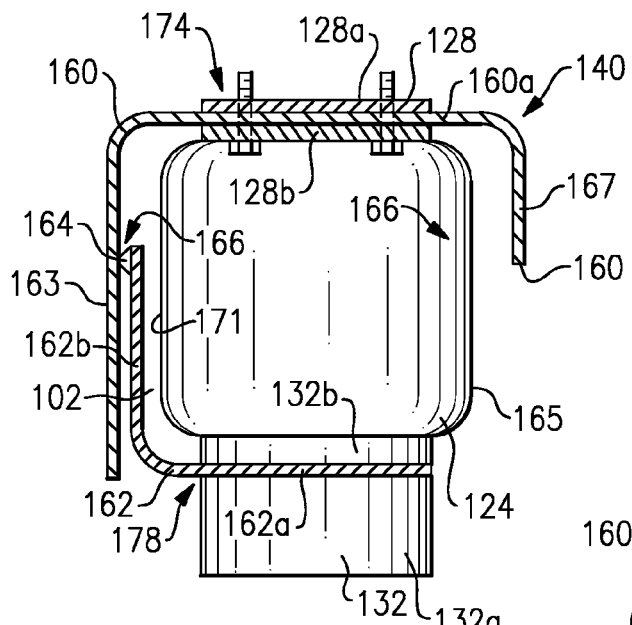
FIG. 15 is another example of an air spring and protective cover in a first position.
Figure 16:
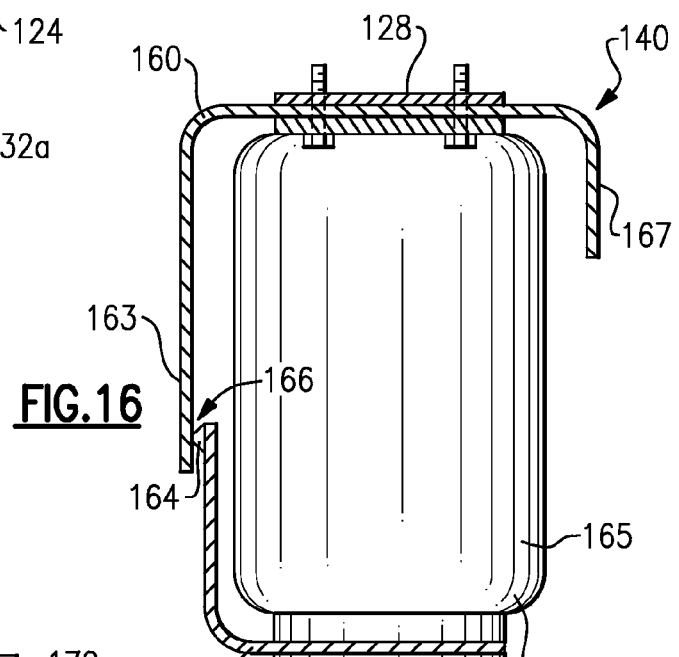
FIG. 16 shows the air spring of FIG. 15 in a second position different from the first position.

Another example of a protective cover 140 is shown in FIGS. 15-16. In this example, the protective cover 140 includes a first portion 160 and a second portion 162 that at least partially overlap each other. This overlapping relationship allows relative sliding movement between the first 160 and second 162 portions between a retracted position (FIG. 15) and an extended position (FIG. 16). As shown in FIGS. 15-16, the first 160 and second 162 portions are configured to have different shapes. The first portion 160 has a generally C-shaped or U-shaped cross-section with one side being shorter than an opposite side. The second portion 162 has a generally L-shaped cross-section.

The first portion 160 is rigidly connected to the first support 128 and the second portion 162 is rigidly connected to the second support 132. The first portion 160 has a base portion 160a and a wall portion 160b that extends from the base portion 160a to surround a portion of the resilient spring body 124 leaving an exposed portion 165 that faces inwardly toward a vehicle center. As shown, an outwardly facing side 163 of the first portion 160 is significantly longer than an inwardly facing side 167 of the first portion 160.

The base portion 160a is rigidly connected to the first support 128 at a connection interface 174. The first support 128 includes first 128a and second 128b portions as discussed above. The base portion 160a is directly sandwiched between the first 128a and second 128b portions to provide a rigid, fixed, and secure connection interface 174 to the vehicle structure 130 (FIG. 12).

The second portion 162 includes a base portion 162a and a wall portion 62b that extends from the base portion 62a to surround only an outwardly facing side 171 of the resilient spring body 124. The base portion 162a is rigidly connected to the second support 132 at a connection interface 178. The second support 132 includes a first portion 132a positioned on one side of the base portion 162a, and a second portion 132b positioned on an opposite side of the base portion 162a. The base portion 162a is directly sandwiched between the first 132a and second 132b portions to provide a rigid, fixed, and secure connection interface 178 to the suspension component 134 (FIG. 12). Any type of connecting mechanism can be used to for the connection interfaces 174, 178, such as a bolted joint for example (only shown for connection interface 174).

In this configuration, upper and lower ends, as well as the outwardly facing side 171 of the resilient spring body 24, are enclosed by the protective cover 140. Rebound and extension movement of the resilient spring body 124 is accommodated by a sliding interface 166 between the first 160 and second 162 portions. An optional seal and/or friction bearing 164 is provided between the first 160 and second 162 portions at the sliding interface 166. It should be understood that while the example shown in FIGS. 15-16 has the second portion 162 received within the first portion 160, the reverse configuration could also be used.

Figure 17:
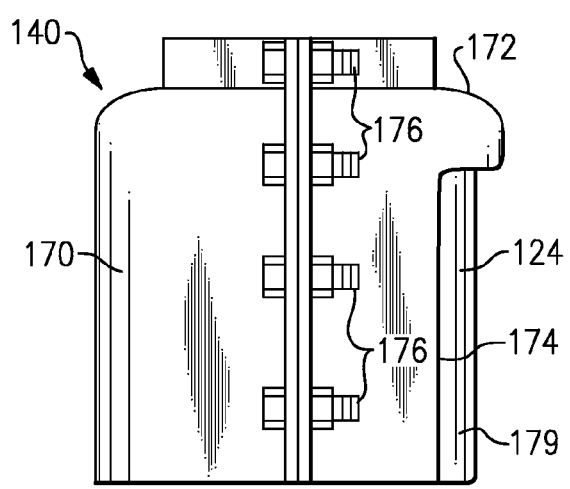
FIG. 17 is another example of a protective cover and air spring.

Another embodiment of the protective cover 140 is shown in FIG. 17. In this example, the protective cover 140 includes a first half 170 and a second half 172 that are fastened together to surround a portion of the resilient spring body 124. The first 170 and second 172 halves are made from a flexible impenetrable armor material such as ballistic nylon, KEVLAR®, or a stainless steel mesh material for example. Optionally, the protective cover 140 could be made from a rigid armor material as described above, with an open end such as that shown in FIGS. 13-14 with a flexible connection 152.

The first half 170 is configured to cover an entire outward facing side of the resilient spring body 124, while the second half 172 has a removed area 174 that faces inwardly toward the vehicle center leaving an exposed portion 179 of the resilient spring body 124.

In the example shown, the first 170 and second 172 halves have different shapes from each other and are fastened together with a plurality of bolts 176, however other types of fasteners or attachment interfaces could also be used. One advantage of the example shown in FIG. 17 is that the first 170 and second 172 halves of the protective cover 140 are easily separated to facilitate maintenance or to reduce weight when the vehicle is not being subjected to harsh external environments.

Figure 18:
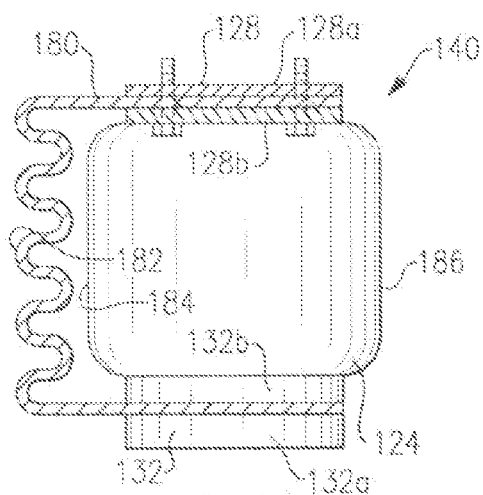
FIG. 18 is another example of an air spring and protective cover in a first position.
Figure 19:
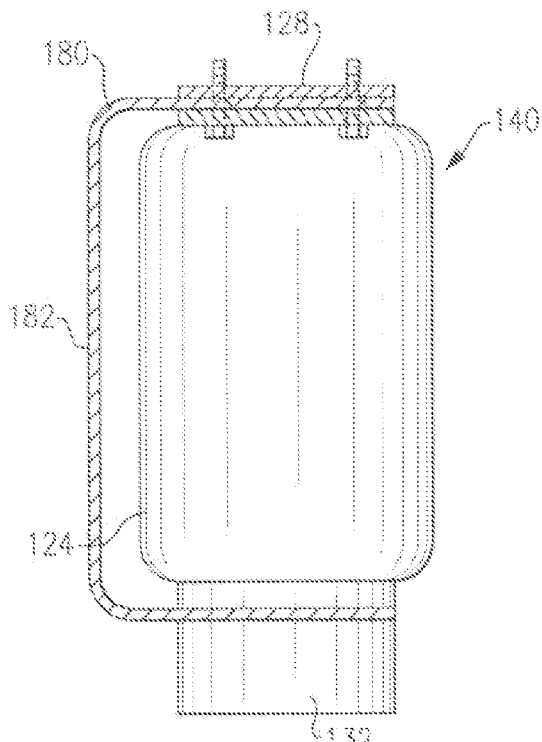
FIG. 19 shows the air spring of FIG. 18 in a second position different from the first position.

In FIGS. 18-19, the resilient spring body 124 is enclosed within a flak jacket 180 that has an accordion body portion 182. One portion of the flak jacket 180 is connected to the first support 128 and another portion of the flak jacket 180 is connected to the second support 132. The first 128 and second 132 supports have first 128a, 132a and second portions 128b, 132b that sandwich the flak jacket 180 in a manner similar to that described above. The flak jacket 180 completely covers an outwardly facing side 184 of the resilient spring body 124 leaving an exposed portion 186 that faces inwardly toward a vehicle center.

The accordion body configuration provides compact packaging and extension characteristics. The accordion body portion 182 is movable between a collapsed position (FIG. 18) and an extended position (FIG. 19) where the accordion body portion 182 is taut. The flak jacket 180 can be designed to provide jounce and/or rebound travel limiting functionality by achieving a taut position at a corresponding extreme position of travel.

Figure 20:
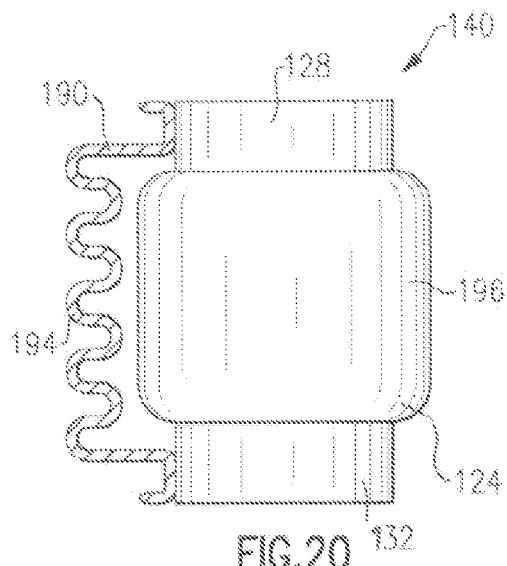
FIG. 20 is another example of an air spring and protective cover.
Figure 21:
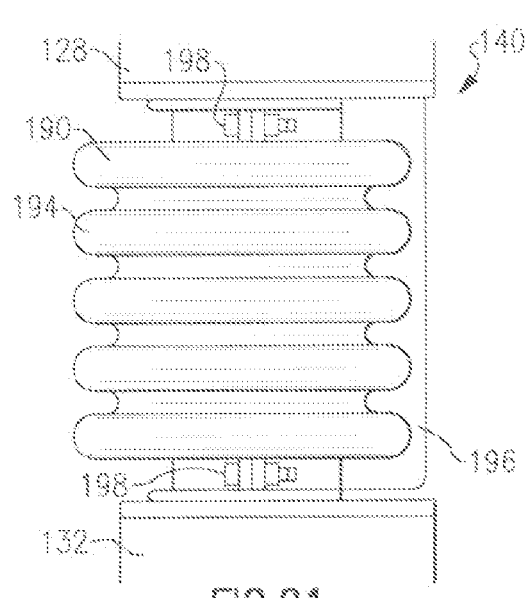
FIG. 21 shows the protective cover of FIG. 20 partially surrounding the air spring and being secured with clamps.

Another example of a protective cover 140 is shown in FIGS. 20-21. In this example, the resilient spring body 124 is enclosed within a flak jacket 190 that is clamped in place. The flak jacket 190 includes an accordion body portion 194 similar to that described above. At least one clamp 198 is used to mount the flak jacket 190 to each support 128, 132. Any type of clamp can be used such as a hose clamp, for example.

In the example shown in FIG. 21, the flak jacket 190 is formed as a single piece that surrounds an outwardly facing portion of the resilient spring body 124 leaving an exposed portion 196. While a one-piece flack jacket, it should be understood that the multiple jacket portions could also joined together to form the flak jacket.

One of the benefits of the example shown in FIGS. 20-21 is that the flak jacket is easily separated from the air spring to facilitate maintenance or to reduce weight when the vehicle is not being subjected to harsh external environments.

In the examples shown in FIGS. 17-21, the protective cover 140 is made from a flexible impenetrable armor material such as ballistic nylon, KEVLAR®, or a stainless steel mesh material for example; however, other flexible impenetrable materials could also be used to form the protective cover 140. The accordion shape shown for the examples of FIGS. 17-21 is just one example shape, and it should be understood that other expandable shapes could also be used.

Further, it should be understood that the protective covers 140 shown in FIGS. 11-21 are just a few examples of different cover configurations having a non-symmetrical configuration. The protective cover could also be formed to have other shapes or sizes.

Finally, the protective cover 140 is made from armor or other impenetrable materials, which can be either rigid or flexible, but which are resistive to penetration by a ballistic projectile such as a bullet or missile, for example. This allows a more beneficial air suspension to be utilized in harsh environment vehicle applications.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An air spring for a vehicle suspension comprising:
a resilient spring body to be supported on a suspension component, said resilient spring body defining a central axis extending along a length of said resilient spring body, and said resilient spring body having an outer circumferential surface surrounding said central axis and an inner circumferential surface that defines an interior cavity;
a first support adapted to connect said resilient spring body to a vehicle frame member and a second support adapted to connect said resilient spring body to the suspension component; and
a protective cover partially surrounding one portion of said outer circumferential surface of said resilient spring body to leave a remaining portion of said outer circumferential surface that is externally exposed, and wherein said one portion of said outer circumferential surface comprises one side of said resilient spring body that is to face away from a vehicle center and wherein said remaining portion of said outer circumferential surface comprises an opposite side of said resilient spring body that is to face inwardly toward the vehicle center, wherein said protective cover has a variable cross-section taken along a direction that is parallel to said central axis;
wherein said protective cover comprises an impenetrable rigid cover having an internal surface that faces said outer circumferential surface of said resilient spring body and an external surface that is resistant to penetration by an object exerting an external force against said external surface; and
wherein said impenetrable rigid cover includes a first cover portion mounted to said first support and a second cover portion mounted to said second support, said first and second cover portions being separate from each other and positioned in an overlapping relationship such that at least one of said first and second cover portions can slide relative to the other of said first and second cover portions, and wherein said first cover portion is defined by a first shape and said second cover portion is defined by a second shape that is different than said first shape.

2. The air spring according to claim 1 wherein said protective cover is non-symmetrical about said central axis.

3. The air spring according to claim 1 wherein said first cover portion is defined by a first length extending in an axial direction along said outer circumferential surface and said second cover portion is defined by a second length extending in an axial direction along said outer circumferential surface, said first and said second lengths being different from each other.

4. The air spring according to claim 1 wherein said impenetrable rigid cover is formed from an impenetrable material comprising at least one of a steel material, an armor material, and a composite material.

5. The air spring according to claim 1 wherein the suspension component comprises a control arm for an independent suspension.

6. The air spring according to claim 1 wherein said interior cavity is filled with air.

7. The air spring according to claim 1 wherein said protective cover comprises an armor material that is resistive to penetration by ballistics.

8. The air spring according to claim 1 wherein said protective cover is selectively attachable to and detachable from the air spring without having to disassemble the air spring from a vehicle.

9. The air spring according to claim 1 wherein said resilient spring body is subject to a plurality of operating conditions and wherein said protective cover is separated from said outer circumferential surface of said resilient spring body by a gap such that there is no contact between said outer circumferential surface of said resilient spring body and said protective cover during at least one of said plurality of operating conditions.

10. The air spring according to claim 9 wherein said at least one of said plurality of operating conditions comprises one of a no suspension load condition and a normal operating condition.

11. The air spring according to claim 1 wherein the first cover portion has a wall portion extending from a base portion, the base portion connected to the first support.

12. The air spring according to claim 11 wherein the first support has a first portion and a second portion, the base portion of the first cover portion being sandwiched between the first and second portions of the first support.

13. The air spring according to claim 1 wherein the second cover portion has a wall portion extending from a base portion, the base portion connected to the second support.

14. The air spring according to claim 13 wherein the second support has a first portion and a second portion, the base portion of the second cover portion being sandwiched between the first and second portions of the second support.

15. The air spring according to claim 1 wherein the first cover portion is bolted to the first support, and the second cover portion is bolted to the second support.

16. The air spring according to claim 1 wherein one of the first and second cover portions has one of a C-shaped cross-section and a U-shaped cross-section, and the other of the first and second cover portions has an L-shaped cross-section.

17. The air spring according to claim 1 wherein the first cover portion has an outwardly facing side that is longer than an inwardly facing side.

18. The air spring according to claim 1 wherein the protective cover has a sliding interface between the first cover portion and the second cover portion.

19. The air spring according to claim 18 wherein the protective cover further comprises a seal provided between the first cover portion and the second cover portion at the sliding interface.

20. The air spring according to claim 18 wherein the protective cover further comprises a friction bearing provided between the first cover portion and the second cover portion at the sliding interface.

21. The air spring according to claim 1 wherein the second cover portion is received within the first cover portion.

22. The air spring according to claim 1 wherein the first cover portion is received within the second cover portion.

* * * * *